(12) United States Patent
Fan et al.

(10) Patent No.: US 11,064,357 B2
(45) Date of Patent: Jul. 13, 2021

(54) METHOD AND APPARATUS FOR MANAGING EMBEDDED UNIVERSAL INTEGRATED CIRCUIT CARD EUICC

(71) Applicant: Huawei Technologies Co., Ltd., Shenzhen (CN)

(72) Inventors: Shunan Fan, Beijing (CN); Shuiping Long, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 123 days.

(21) Appl. No.: 16/343,241

(22) PCT Filed: Oct. 20, 2016

(86) PCT No.: PCT/CN2016/102721
§ 371 (c)(1),
(2) Date: Apr. 18, 2019

(87) PCT Pub. No.: WO2018/072177
PCT Pub. Date: Apr. 26, 2018

(65) Prior Publication Data
US 2019/0253884 A1 Aug. 15, 2019

(51) Int. Cl.
*H04M 1/66* (2006.01)
*H04W 12/06* (2021.01)
(Continued)

(52) U.S. Cl.
CPC ......... *H04W 12/06* (2013.01); *H04L 63/0853* (2013.01); *H04L 63/0869* (2013.01);
(Continued)

(58) Field of Classification Search
CPC ............... H04W 12/00; H04W 12/004; H04L 63/0853; G06F 21/00
See application file for complete search history.

(56) References Cited

U.S. PATENT DOCUMENTS 9,021,548 B2 * 4/2015 Holtmanns ......... G06F 21/6209
726/1
9,301,145 B2 * 3/2016 Merrien ................ H04L 63/123
(Continued)

FOREIGN PATENT DOCUMENTS

CN   101990196 A   3/2011
CN   101494854 B   5/2011
(Continued)

OTHER PUBLICATIONS

GSM Association Non-confidential, Official Document SGP.22—RSP Technical Specification, RSP Technical Specification, Version 1.0, Jan. 13, 2016, 114 pages.
(Continued)

*Primary Examiner* — Shantell L Heiber
(74) *Attorney, Agent, or Firm* — Conley Rose, P.C.

(57) ABSTRACT

Embodiments of the present invention relate to a method and an apparatus for managing an embedded universal integrated circuit card eUICC. The eUICC is installed in a terminal, a profile is installed in the eUICC, the profile is locked according to a policy rule, and the method includes: determining, by the terminal, identifier information and verification information of the profile that needs to be unlocked, where the identifier information of the profile is used to identify the profile installed in the terminal; and sending, by the terminal, a first unlock message to the eUICC, where the first unlock message carries the identifier information and the verification information of the profile, and the first unlock message is used to instruct the eUICC to determine the profile, and unlock the profile according to the policy rule after verification performed according to the verification information succeeds.

14 Claims, 14 Drawing Sheets

(51) Int. Cl.

| | | |
|---|---|---|
| *H04W 8/18* | (2009.01) | |
| *H04W 4/60* | (2018.01) | |
| *H04W 4/50* | (2018.01) | |
| *H04W 12/71* | (2021.01) | |
| *H04L 29/06* | (2006.01) | |
| *H04W 8/20* | (2009.01) | |

(52) U.S. Cl.
CPC ............ *H04L 63/102* (2013.01); *H04W 4/50* (2018.02); *H04W 4/60* (2018.02); *H04W 8/183* (2013.01); *H04W 12/71* (2021.01); *H04W 8/20* (2013.01)

(56) References Cited

U.S. PATENT DOCUMENTS

| | | | |
|---|---|---|---|
| 2008/0208715 A1* | 8/2008 | Hod ....................... | G06Q 30/06 705/26.62 |
| 2013/0305047 A1* | 11/2013 | Xi ......................... | H04L 63/083 713/168 |
| 2014/0087790 A1 | 3/2014 | Babbage et al. | |
| 2015/0110035 A1* | 4/2015 | Lee ....................... | H04L 63/205 370/329 |
| 2016/0105540 A1* | 4/2016 | Kwon ............... | H04N 21/41407 715/747 |
| 2016/0149903 A1* | 5/2016 | Suh ....................... | H04W 12/06 713/156 |
| 2017/0064552 A1* | 3/2017 | Park .................... | H04L 63/0869 |
| 2017/0188226 A1 | 6/2017 | Wu | |
| 2019/0182659 A1* | 6/2019 | Ahmed ................. | H04W 8/265 |

FOREIGN PATENT DOCUMENTS

| | | | |
|---|---|---|---|
| CN | 102158850 | A | 8/2011 |
| CN | 104185179 | A | 12/2014 |
| CN | 104469737 | A | 3/2015 |
| CN | 105228125 | A | 1/2016 |
| JP | 2012199751 | A | 10/2012 |
| JP | 2012235182 | A | 11/2012 |
| WO | 2013066076 | A1 | 5/2013 |
| WO | 2014171711 | A1 | 10/2014 |

OTHER PUBLICATIONS

Machine Translation and Abstract of Chinese Publication No. CN101494854, Jul. 29, 2009, 18 pages.
Machine Translation and Abstract of Chinese Publication No. CN104185179, Dec. 3, 2014, 22 pages.
Foreign Communication From a Counterpart Application, PCT Application No. PCT/CN2016/102721, English Translation of International Search Report dated Jul. 24, 2017, 2 pages.
Foreign Communication From a Counterpart Application, PCT Application No. PCT/CN2016/102721, English Translation of Written Opinion dated Jul. 24, 2017, 4 pages.
Machine Translation and Abstract of Chinese Publication No. CN102158850, Aug. 17, 2011, 13 pages.
Foreign Communication From a Counterpart Application, Chinese Application No. 201680042302.2, Chinese Office Action dated Sep. 27, 2019, 10 pages.
Machine Translation and Abstract of International Publication No. WO2013066076, May 10, 2013, 34 pages.
Machine Translation and Abstract of International Publication No. CN2014171711, Oct. 23, 2014, 56 pages.
Foreign Communication From a Counterpart Application, Chinese Application No. 16919171.5, Extended European Search Report dated Aug. 26, 2019, 8 pages.
"User Identification Card (UIM) and Over-the-Air Activation Technology (OTA) in CDMA systems," China mobile communication BBS, Retrieved from the Internet:https://www.cnblogs.com/bastard/archive/2013/02/23/2922726.html on Sep. 25, 2019, 3 pages.
English Translation of "User Identification Card (UIM) and Over-the-Air Activation Technology (OTA) in CDMA systems," China mobile communication BBS, Retrieved from the Internet:https://www.cnblogs.com/bastard/archive/2013/02/23/2922726.html on Sep. 25, 2019, 4 pages.

* cited by examiner

METHOD AND APPARATUS FOR MANAGING EMBEDDED UNIVERSAL INTEGRATED CIRCUIT CARD EUICC

CROSS-REFERENCE TO RELATED APPLICATIONS

This application is a national stage of International Application No. PCT/CN2016/102721, filed on Oct. 20, 2016, which is hereby incorporated by reference in its entirety.

TECHNICAL FIELD

Embodiments of the present invention relate to the field of eUICC management, and in particular, to a method and an apparatus for managing an embedded universal integrated circuit card eUICC.

BACKGROUND

In an application and development process of telecom technologies, appearance of a contract phone, a carrier branded smartphone, and the like allows for a good balance between costs of using a communications service by a user and operational benefits of an operator. To constrain a user to use a communications service according to an agreement, usually, on a contract phone, a carrier branded smartphone, or the like, some operations of the user or services supported by the device are limited to some extent in a range conforming to regulations. For example, an operator makes some agreements with a user in aspect of a 4G service. To constrain the user to comply with the agreements, supporting of a 4G service of another operator may be limited on a contract phone used by the user. This is also referred to as a network lock or a simlock (simlock).

However, in such a manner, when or before the agreements expire, if termination of the agreements is desired in a paid manner, usually, the contract phone or the carrier branded smartphone needs to be carried to a physical store of the operator for technical agreement termination (or referred to as unlocking). Alternatively, a customer service phone is called, or an operator web page is browsed by using a computer, or another manner is used, to initiate an agreement termination/unlock request, and then the operator updates firmware, software, or a parameter of the contract phone by using OTA (over the air, over the air) or DM (device management, device management) to perform unlocking, and even some contract phones or carrier branded smartphones do not support termination of the agreements. In some countries, for example, Japan, there are legal provisions that an operator shall be obliged to provide an unlock service to a user.

SUMMARY

Embodiments of the present invention provide a method and an apparatus for managing an embedded universal integrated circuit card eUICC, so as to unlock the eUICC by using a terminal in which the eUICC is installed. This is convenient and fast, and provides a high-quality user experience.

According to a first aspect, an embodiment of the present invention provides a method for managing an embedded universal integrated circuit card eUICC. The eUICC is installed in a terminal, a profile is installed in the eUICC, the profile is locked according to a policy rule, and the method includes: determining, by the terminal, identifier information and verification information of the profile that needs to be unlocked, where the identifier information of the profile is used to identify the profile installed in the terminal; and sending, by the terminal, a first unlock message to the eUICC, where the first unlock message carries the identifier information and the verification information of the profile, and the first unlock message is used to instruct the eUICC to determine the profile, and unlock the profile according to the policy rule after verification performed according to the verification information succeeds. By using this embodiment of the present invention, unlocking can be implemented on a used terminal device by using an LPA module, so that complex operations for implementing unlocking by a user externally can be avoided. If the terminal completely downloads the profile and locks the card by using the LPA, in a scenario in which the user pays an additional fee for unlocking, a contract expires, user switching is performed, a secondhand terminal transaction is performed, or the like, an operator or the user triggers unlocking.

In an optional implementation, the determining, by the terminal, identifier information of the profile that needs to be unlocked includes: receiving, by the terminal, a second unlock message, where the second unlock message carries the identifier information of the profile, and the second unlock message is used to instruct to unlock the profile.

In another optional implementation, when the second unlock message is from a profile download server, the second unlock message further includes the verification information. By using this embodiment of the present invention, the profile download server may trigger unlocking of the eUICC.

In still another optional implementation, before the sending, by the terminal, a first unlock message to the eUICC, the method further includes: generating, by the terminal, prompt information according to the first unlock message, and displaying the prompt information on a user interface, where the prompt information is used to prompt for the profile that needs to be unlocked; and receiving, by the terminal, unlock confirmation information by using the user interface. By using this embodiment of the present invention, verification can be performed by using verification information entered by a user.

In yet another optional implementation, when the second unlock message is from the terminal, the determining, by the terminal, verification information includes: receiving, by the terminal, the verification information by using a user interface. By using this embodiment of the present invention, the terminal may trigger unlocking of the eUICC.

In yet another optional implementation, the unlocking the profile according to the policy rule includes: receiving, by the terminal, a third unlock message sent by the eUICC, where the third unlock message carries the identifier information and the verification information of the profile; and sending, by the terminal, the third unlock message to a profile download server, so that the profile download server performs verification and/or registration.

In yet another optional implementation, when the second unlock message is from the terminal, the determining, by the terminal, verification information includes: sending, by the terminal, a fourth unlock message to the profile download server, where the fourth unlock message carries the identifier information of the profile that needs to be unlocked, and the fourth unlock message is used to message the verification information; and receiving, by the terminal, the verification information sent by the profile download server.

In yet another optional implementation, the method further includes: obtaining, by the terminal, information about the eUICC and information about an SM-DP, to perform mutual authentication on the eUICC and the SM-DP.

In yet another optional implementation, after the receiving, by the terminal, a second unlock message, the method further includes: displaying, by the terminal, a payment interface, to perform a pay-to-unlock operation.

According to a second aspect, an embodiment of the present invention provides a method for managing an embedded universal integrated circuit card eUICC. The eUICC is installed in a terminal, a profile is installed in the eUICC, the profile is locked according to a policy rule, and the method includes: receiving, by the eUICC, a first unlock message sent by the terminal, where the first unlock message carries identifier information and verification information of the profile, and the identifier information of the profile is used to identify the profile installed in the terminal; determining, by the eUICC, the profile, and performing verification according to locally stored verification information and the verification information carried in the first unlock message; and unlocking, by the eUICC, the profile according to the policy rule after the verification succeeds.

In an optional implementation, the unlocking, by the eUICC, the profile according to the policy rule includes: determining, by the eUICC according to the policy rule, whether the profile satisfies an unlock condition; and if the profile satisfies the unlock condition, unlocking, by the eUICC, the profile, and setting a provisioning profile PP to an enabled state.

In another optional implementation, before the unlocking, by the eUICC, the profile according to the policy rule, the method further includes: sending, by the eUICC, another unlock message to a profile download server by using the terminal, where the another unlock message carries the identifier information and the verification information of the profile, and the another unlock message is used to message the profile download server to confirm to unlock the profile; and receiving, by the eUICC by using the terminal, unlock response information sent by the profile download server.

In still another optional implementation, before the unlocking, by the eUICC, the profile according to the policy rule, the method further includes: performing, by the eUICC, mutual authentication with the SM-DP by using the terminal.

According to a third aspect, an embodiment of the present invention provides a method for managing an embedded universal integrated circuit card eUICC. The eUICC is installed in a terminal, a profile is installed in the eUICC, the profile is locked according to a policy rule, and the method includes: determining, by a profile download server, identifier information and verification information of the profile that needs to be unlocked, where the identifier information of the profile is used to identify the profile installed in the terminal; and when the profile satisfies an unlock condition, after verification performed according to the verification information succeeds, marking, by the profile download server, the profile as unlocked.

In an optional implementation, after the determining, by an SM-DP, identifier information and verification information of the profile that needs to be unlocked, the method further includes: sending, by the profile download server, an unlock message to the terminal, where the unlock message carries the identifier information of the profile, and the unlock message is used to instruct to unlock the profile.

In still another optional implementation, the determining, by an SM-DP, identifier information and verification information of the profile that needs to be unlocked includes: receiving, by the profile download server, the identifier information and the verification information of the profile that are sent by the terminal.

According to a fourth aspect, an embodiment of the present invention provides an apparatus for managing an eUICC. The apparatus can implement steps performed by the terminal in the method according to the first aspect and the optional implementations. The apparatus may be implemented by hardware, or may be implemented by executing corresponding software by hardware. The hardware or software includes one or more modules corresponding to the foregoing function.

According to a fifth aspect, an embodiment of the present invention provides an apparatus for managing an eUICC. The apparatus can implement steps performed by the eUICC in the method according to the second aspect and the optional implementations. The apparatus may be implemented by hardware, or may be implemented by executing corresponding software by hardware. The hardware or software includes one or more modules corresponding to the foregoing function.

According to a sixth aspect, an embodiment of the present invention provides an apparatus for managing an eUICC. The apparatus can implement steps performed by the eprofile download server in the method according to the third aspect and the optional implementations. The apparatus may be implemented by hardware, or may be implemented by executing corresponding software by hardware. The hardware or software includes one or more modules corresponding to the foregoing function.

According to a seventh aspect, an embodiment of the present invention provides a terminal. The terminal includes a transceiver, a processor, and a memory. The transceiver is configured to interact with a profile download server, and may include a receiver and a transmitter. The memory is configured to store a program and data. The processor executes the program stored in the memory, to implement steps performed by a sending device according to the first aspect and the optional implementations.

According to an eighth aspect, an embodiment of the present invention provides a profile download server. The receiving device includes a transceiver, a processor, and a memory. The modules may be connected by using a bus. The transceiver is configured to communicate with a terminal. The memory is configured to store program code and data. The processor performs, according to a program instruction stored in the memory, operations and steps of the profile download server according to the third aspect and the optional implementations.

According to a ninth aspect, an embodiment of the present invention provides an eUICC. The receiving device includes a transceiver, a processor, and a memory. The modules may be connected by using a bus. The transceiver is configured to communicate with a terminal and a profile download server. The memory is configured to store program code and data. The processor performs, according to a program instruction stored in the memory, operations and steps of the eUICC according to the second aspect and the optional implementations.

According to a tenth aspect, an embodiment of the present invention provides a computer storage medium, configured to store a computer software instruction used by the foregoing terminal and including a program designed to perform the first aspect and the optional implementations.

According to an eleventh aspect, an embodiment of the present invention provides a computer storage medium, configured to store a computer software instruction used by the foregoing eUICC and including a program designed to perform the second aspect and the optional implementations.

According to a twelfth aspect, an embodiment of the present invention provides a computer storage medium, configured to store a computer software instruction used by the foregoing profile download server and including a program designed to perform the third aspect and the optional implementations.

According to a thirteenth aspect, an embodiment of the present invention provides an eUICC management system. The eUICC management system includes a terminal, an eUICC, and a profile download server, where the terminal is the terminal according to the seventh aspect; the profile download server is the profile download server according to the eighth aspect; and the eUICC is the eUICC according to the ninth aspect.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DESCRIPTION OF EMBODIMENTS

Figure 1:
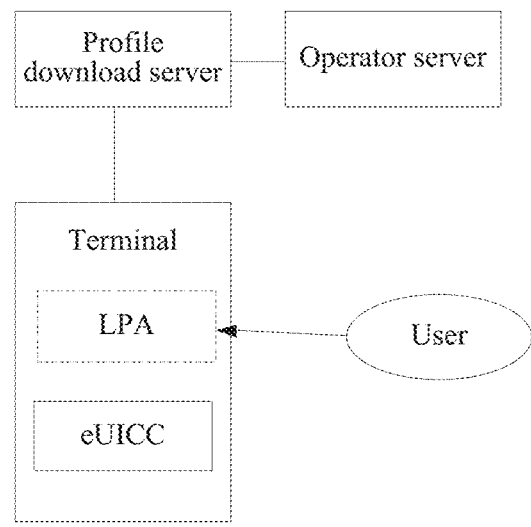
FIG. 1 is a schematic diagram of a system architecture according to the present invention.

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In the embodiments of the present invention, a UICC (Universal Integrated Circuit Card, universal integrated circuit card) is a removable smart card. A user only needs to draw out a UICC card from a terminal and insert the UICC card into another terminal, to conveniently transfer information stored in the UICC from the terminal to the another terminal.

An eUICC (embedded UICC, embedded universal integrated circuit card) is formed by embedding the UICC into a terminal by using encapsulation, welding, or the like. The eUICC is inconvenient to plug and cannot be randomly changed like the UICC, and therefore, can avoid a risk of being stolen or used for another purpose. The eUICC may also be referred to as an eSIM (embedded Subscriber Identity Module, embedded subscriber identity module) or a smart card.

An ICCID (Integrated Circuit Card ID, integrated circuit card identifier) is used to uniquely identify a profile. The ICCID may also be referred to as a profile ID.

An EID (eUICC-ID, eUICC identifier) is an eUICC identifier, and is used to uniquely identify an eUICC.

An EIS (eUICC Information Set, eUICC information set) is an eUICC information set and includes basic information of an eUICC, for example, information such as an EID, a production date, total storage space, available storage space, a quantity of profiles currently stored in the eUICC, and a type.

A profile is a set of file structures, data, application programs, and the like, and may include one or more network access applications and corresponding network access credentials, for example, an international mobile subscriber identity and a personal key identity (Key Identity, KI).

A provisioning profile is a profile having a provisioning type or attribute, which is referred to as a provisioning profile for short. The profile is mainly used to provide a connection between an eUICC and a profile download server. The profile download server manages the eUICC and the profile by using the connection provided by the profile (for example, downloads a new profile, and enables, disables, or deletes the profile).

An operational profile is a profile having an operational type or attribute, Which is referred to as an operational profile for short. A terminal and an eUICC may access, by using the profile, all allowed networks that the profile subscribes to. A function of the operational profile is similar to that of an existing UICC.

An enabled profile is an enabled profile. Only a file and an application in the enabled profile can be selected by using an interface between a terminal and an eUICC. That is, a profile can be used by the terminal to access a network, only after the profile is enabled.

A disabled profile is a disabled profile, that is, a profile that is not used to access a network.

Policy rules are policy rules, and are a series of rules used to control a behavior of an eUICC or a behavior of another entity that remotely manages an eUICC, for example, a condition that needs to be satisfied for performing an operation.

As shown in FIG. 1, FIG. 1 is a schematic diagram of a system architecture according to the present invention. The system architecture includes:

an SM-DP (Subscription Manager-Data Preparing, subscription manager-data preparing) that may generate, according to basic subscription information (for example, an IMSI (International Mobile Subscriber Identity, international mobile subscriber identity)) provided by an MNO (Mobile Network Operator, mobile network operator), a profile that can be downloaded to an eUICC, and is also referred to as a profile provisioner or a profile download server;

an EUM (eUICC Manufacturer, eUICC manufacturer) that is an eUICC manufacturer, produces and sells eUICC cards, and provides delivery information (an EIS) of the eUICC to an SM-SR initially associated with the eUICC; and a CI (Certificate Issuer, certificate issuer) that is a certificate issuer and used to issue a certificate to another entity such as a download server.

In the embodiments of the present invention, a terminal (Terminal) may also be referred to as a system, a subscriber unit, a subscriber station, a mobile station, a mobile station, a remote station, a remote terminal, a mobile device, a user terminal, a mobile terminal, a wireless communications device, a user agent, a user apparatus, or user equipment (User Equipment, UE for short). For example, the terminal may be a cellular phone, a cordless phone, a smartwatch, a wearable device, a tablet device, an unmanned aerial vehicle, a vending machine, a sensor device, a Session Initiation Protocol (Session Initiation Protocol, SIP for short) phone, a wireless local loop (Wireless Local Loop, WLL for short) station, a personal digital assistant (Personal Digital Assistant, PDA for short), a handheld device having a wireless communication function, a computing device, an in-vehicle communications module, a smart meter, a smart home device or another processing device connected to a wireless modem. An eUICC is installed in the terminal, a profile is installed in the eUICC, and the profile includes policy rules.

Figure 2:
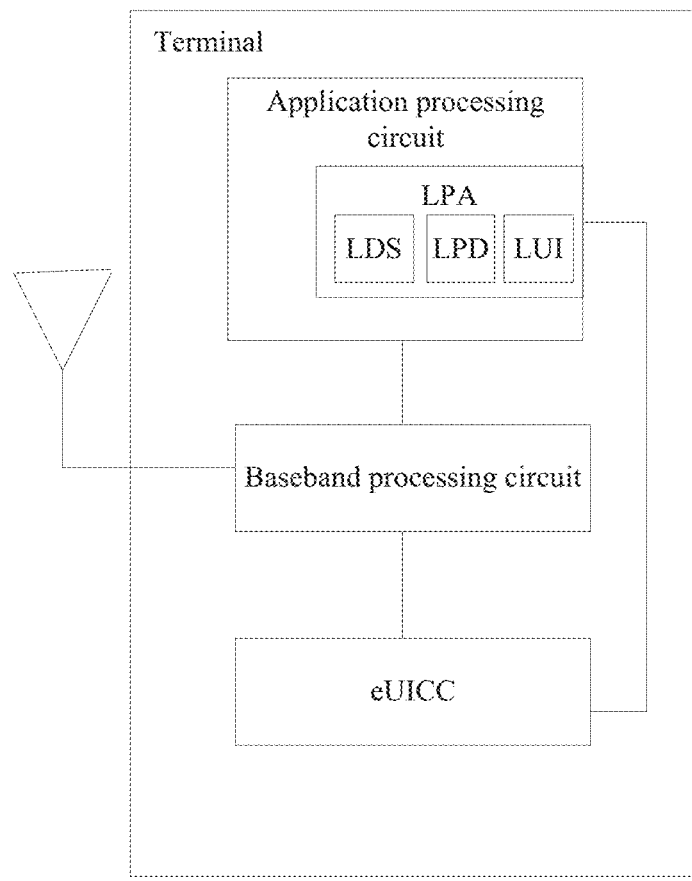
FIG. 2 is a schematic structural diagram of a terminal according to an embodiment of the present invention.

The terminal is further described below with reference to FIG. 2. FIG. 2 shows an example of an embodiment of a terminal 200 configured to implement a method in the present invention. The terminal 200 includes an application processing circuit 202, an eUICC 204, and one or more radio interfaces, and an associated baseband processing circuit 206.

The application processing circuit 202 may include a digital signal processor, a microprocessor, a field programmable gate array, or a plurality of processing components installed on one or more substrates. The application processing circuit 202 may further include a memory. The memory may include, for example, an SRAM, a flash memory, and an SDRAM component. The memory stores a computer executable instruction and data that can be executed by a processor subsystem.

The application processing circuit 202 may include an LPA (Local Profile Assistant, local provisioning profile assistant) module. The LPA is configured to: download and manage a profile, and provide a UI interface to a terminal user (for example, provide a profile installation list), so that the terminal user can manage a local profile in an eUICC (enable, disable, delete, and unlock). In addition, an EID and/or an ICCID may be searched for by using the LPA module. The LPA may be a virtual logic module, or may be a physical module, for example, a field programmable gate array.

The application processing circuit 202 and the one or more baseband processing circuits 206 both directly communicate with the eUICC 204. The application processing circuit 202 directly communicates with the eUICC 204 by using the LPA. However, a person of ordinary skill in the art should understand that, various aspects of the present invention provide multi-layer access control and parallel access. Therefore, in some embodiments, the application processor may directly access a tool kit application program without affecting main access control on a client interface. For example, a user can search any profile for contact information without (operationally) switching to a different profile.

The LPA includes:

a local discovery service (Local Discovery Service, LDS), a local provisioning profile download (Local Profile Download, LPD), and a local user interface UI interface (Local User Interface, LUI). A user terminal and the LPA in the eUICC may include any one or more of the LDS, the LPD, or the LUI.

The LUI (Local User Interface, local user interface) module provides a UI for user selection and user switching, and provides a UI for unlocking the eUICC and removing a SIMLock by a user. The LUI module may receive an unlock request from a network or an unlock request triggered by a user of the terminal. When the unlock request from the network is received, the verification information may be carried. After the LUI informs the user that an unlock operation is to be performed, the LUI notifies the eUICC, and after the eUICC successfully performs matching on the verification information, the eUICC is unlocked. For example, a disable not allowed parameter in a policy rule is changed, so that an enabled profile may be disabled, or a "disable" switch in a policy rule is enabled, so that a policy rule for locking the eUICC is invalid, or an enabled profile is deleted, to unlock the eUICC. That the eUICC is locked may mean that an enabled profile that is in the eUICC and that is being used to access a particular operator network cannot be replaced, that is, the terminal can access only a subscribed and eligible service provided by the particular operator network. When the unlock request from the user of the terminal is received, after the user enters verification information in the LUI, the LUI may notify the eUICC, so that after the eUICC successfully performs matching on the verification information, the eUICC is unlocked. When the unlock request from the user of the terminal is received, the terminal may further request a server to return the verification information, so as to unlock the eUICC. Further, the server may calculate a payment amount required for unlocking, and after successful payment, the server returns the verification information, the LUI notifies the eUICC, and after the eUICC successfully performs matching on the verification information, the eUICC is unlocked.

The baseband processing circuit 206 is further configured to communication with another device such as a network device. Proper antennas and modem subsystems are deployed, so that the baseband processing circuit 206 supports different radio technologies such as a GSM, CDMA, a UMTS, LTE/LTE-A, WiMAX, a WLAN, Bluetooth, a LPWAN (Low-Power Wide-Area Network, low power wide area network). LoRa (Long Range, long range low power Internet of Things transmission technology), Sigfox, NB-IoT (Narrow-Band IoT, narrowband IoT), and LTE-M (Long Term Evolution Machine to Machine, Long Term Evolution Machine to Machine).

It should be noted that FIG. 2 shows only a simplified structure of the terminal. Although not shown, the terminal may further include one or more components of a touch-screen (such as a multi-touch interface), an LCD display, a speaker and/or a microphone.

Figure 3:
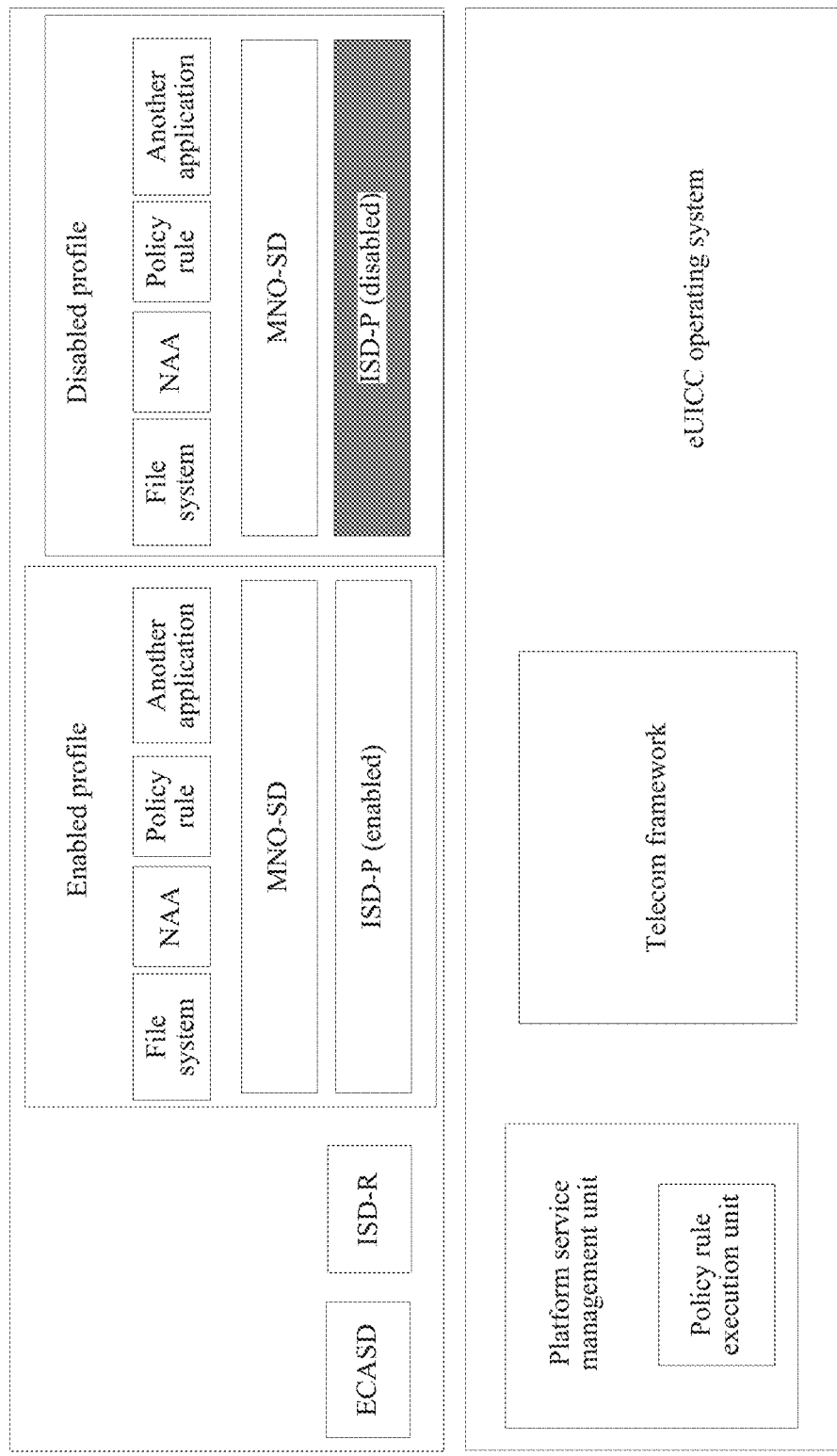
FIG. 3 is a schematic structural diagram of an eUICC.

A structure of the eUICC is further described with reference to FIG. 3. As shown in FIG. 3, the eUICC includes:

an ECASD (eUICC Controlling Authority Security Domain, eUICC controlling authority security domain) used to store a certificate and a private key of the eUICC, and store a public key of a CI, where the ECASD may also store a key used for key negotiation, or the like; and the ECASD stores the key and the certificate of the eUICC; and an ISD-R (Issuer Security Domain Root, issuer security domain root) that is preset before delivery of the eUICC, is a security domain having a relatively high authority, is used to complete some security verification, and may be further used to create a new ISD-P (Issuer Security Domain Profile, issuer security domain profile).

The ISD-P is also referred to as a profile domain, is space used to store the profile, and stores a key for performing security communication with the SM-DP, and a credential used to decrypt and install the profile.

Two profiles are further shown in FIG. 3, where one is an enabled profile, and the other is a disabled profile. Each profile further includes: a file system, an NAA (Network Access Application, network access application), a policy rule, another application, and an MNO-SD (Mobile Network Operator Security Domain, mobile network operator security domain).

An eUICC operating system includes a platform service management unit (Platform Service Manager) and a telecom framework (Telecom Framework). The platform service management unit is configured to provide a platform management function and a policy rule execution mechanism. The telecom framework is configured to provide a standard network authorization algorithm to the NAA, and further can configure an algorithm by using a requirement parameter.

Figure 4:
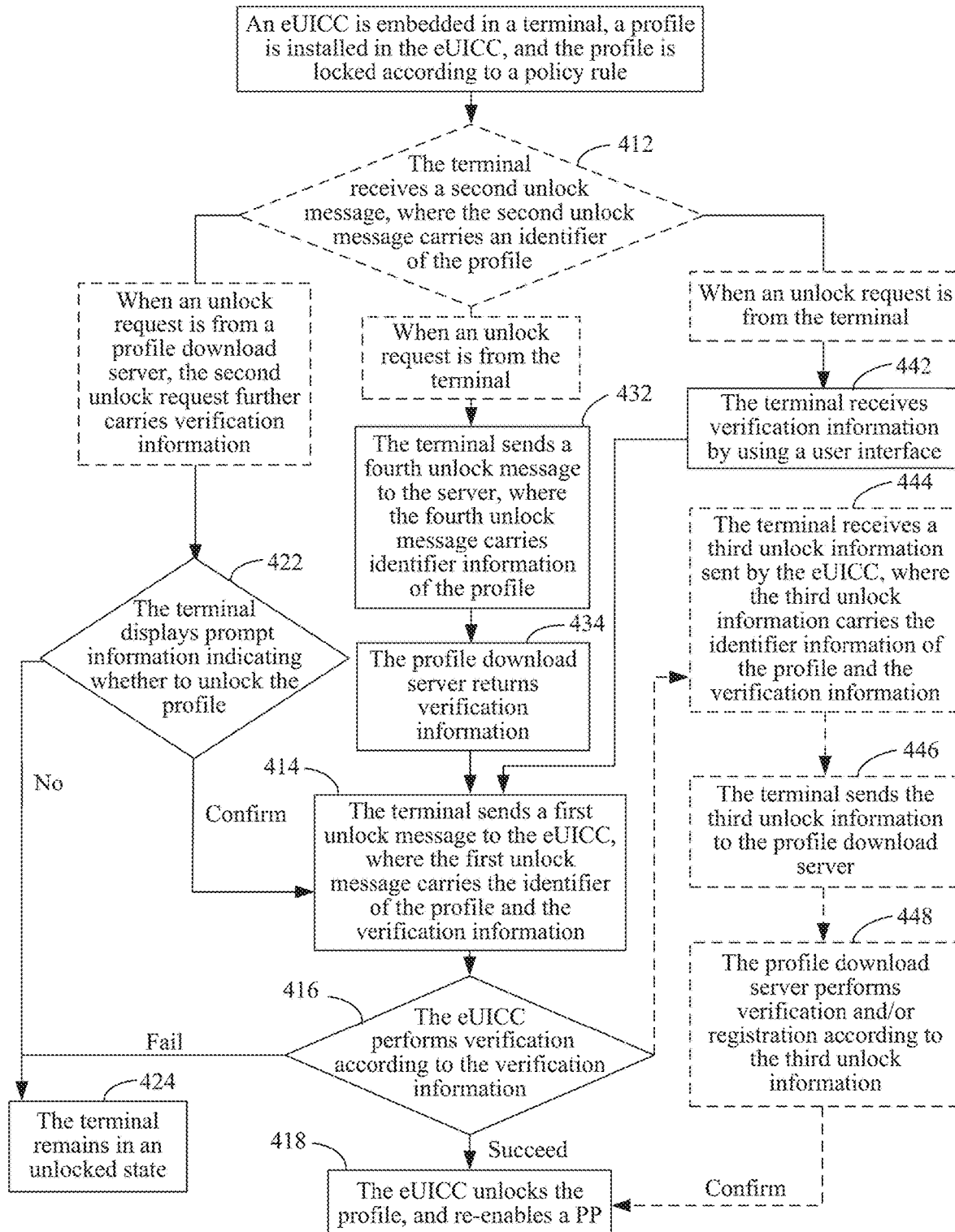
FIG. 4 is a schematic flowchart of a method for managing an eUICC according to an embodiment of the present invention.

FIG. 4 is a schematic flowchart of a method for managing an eUICC according to an embodiment of the present invention. As shown in FIG. 4, the eUICC is installed in a terminal, a profile is installed in the eUICC, and the profile is locked according to a policy rule. The policy rule further correspondingly includes verification information. The verification information may be a preset password or verification code such as a PIN, or may be identity information such as an operator identifier. The method specifically includes the following steps.

Step 412: The terminal receives a second unlock message, where the second unlock message carries an identifier of the profile.

When an unlock operation is performed on the profile, first, a profile of an eUICC on which an unlock operation is to be performed needs to be determined, that is, the terminal determines identifier information of the profile that needs to be unlocked.

The terminal further needs verification information, to facilitate verification, thereby ensuring that only a party having an authority can unlock the profile.

Step 414: The terminal sends a first unlock message to the eUICC, where the first unlock message carries the identifier and verification information of the profile.

The first unlock message is used to instruct the eUICC to unlock the profile after verification succeeds.

Step 416: The eUICC performs verification according to the verification information.

After receiving the first unlock message sent by the terminal, the eUICC performs verification according to the verification information carried in the first unlock message, for example, makes a comparison according to locally stored verification information, or determines, according to the verification information, whether an initiator of the first unlock request has an authority.

Step 418: The eUICC unlocks the profile, and re-enables a PP.

After determining the verification information, the eUICC unlocks the profile identified by the identifier information of the profile carried in the first unlock message, for example, releases an operation authority of the profile, for example, deletes the profile, or downloads and enables a profile of another operator for use.

After the eUICC performs verification according to the verification information and determines that the verification fails, the terminal remains in a locked state.

In this embodiment of the present invention, the terminal in which the eUICC is installed implements the unlock operation on the eUICC, so that the eUICC is more conveniently unlocked, a use scenario of the eUICC is increased, and costs for producing a contract phone by an operator is reduced. Therefore, usability of the contract phone is higher, and high-quality user experience is provided.

In a specific implementation process of this embodiment of the present invention, there are a plurality of implementations for sources of the second unlock message. This embodiment of the present invention is further described by using that the second unlock message is from a profile download server or the terminal.

In an embodiment, when the unlock message is from the profile download server, the second unlock message further carries the verification information. The profile download server may send the second unlock message to the terminal, where the second unlock message carries the identifier information and the verification information of the profile. The method further specifically includes the following steps.

Step 422: The terminal displays prompt information indicating whether to unlock the profile.

After receiving the second unlock message sent by the profile download server, the terminal may display the prompt information on a user interface, to prompt for the profile that needs to be unlocked.

After receiving a confirmation message by using the user interface, the terminal performs step 414.

After the terminal receives, by using the user interface, a message indicating cancellation or no, the terminal remains in the locked state.

In another embodiment, when the second unlock message is from the terminal, the terminal further needs to determine the verification information. The method further specifically includes the following steps.

Step 442: The terminal receives the verification information by using a user interface.

After this step, step 414 may be performed.

After step 416 is performed, after the verification performed by the eUICC succeeds, registration may be performed with the profile download server, and the following step further needs to be performed.

Step 444: The terminal receives a third unlock information sent by the eUICC, where the third unlock information carries the identifier information and the verification information of the profile.

Step 446: The terminal sends the third unlock information to the profile download server. The third unlock information carries the identifier information of the profile, and may further carry the verification information. Alternatively, the third unlock information may further carry information indicating that the verification performed by the eUICC succeeds.

Step 448: The profile download server performs verification and/or registration according to the third unlock information.

The profile download server may return a confirmation message after the verification succeeds and/or the registration succeeds. The eUICC performs step 418 after receiving the confirmation message sent by the profile download server.

In still another embodiment, when the second unlock message is from the terminal, the terminal may further verify the verification information for the profile download server. The method further specifically includes the following steps.

Step 432: The terminal sends a fourth unlock message to the server, where the fourth unlock message carries the identifier information of the profile.

Step 434: The profile download server returns the verification information.

Step 414 continues to be performed.

This embodiment of the present invention is further described below with reference to the accompanying drawings. As shown in FIG. 4A to FIG. F, the terminal 2000 includes a main body 2100. The main body 2100 includes a touchscreen 2110. A touch panel and a display panel may be integrated to implement input and output functions of the terminal 2000. The touchscreen 2100 displays the user interface. A photosensitive element 2120, an earpiece 2130, a camera 2140, a function key 2150, a volume key 2160, and a power key 2170 are further shown in the figure. The camera 2140 may be a front-facing camera or may include a rear-facing camera. It should be learned that, the terminal shown in the figure is merely an example, and the terminal in this embodiment of the present invention may include more or fewer components.

Figure 5A:
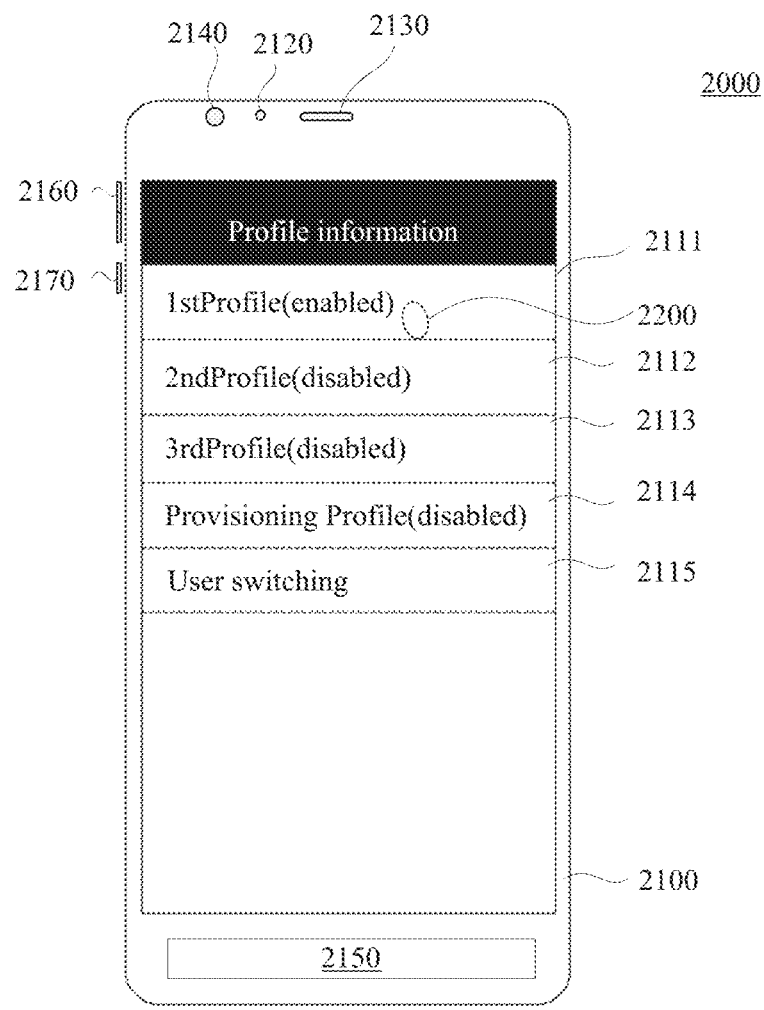
FIG. 5A is an example of a terminal.

As shown in FIG. 5A, an LUI module in the terminal 2000 includes a profile information list. Profile information in the eUICC can be viewed by triggering by a user. FIG. 5A shows three profile (a 1stProfile option 2111, a 2ndProfile option 2112, and a 3rdProfile option 2113) management options, an option 2114 of a provisioning profile, and a user switching option 2115. A profile corresponding to the 1stProfile option 2111 is enabled (enabled), and profiles corresponding to the other options are in a disabled state (disabled).

Figure 5B:
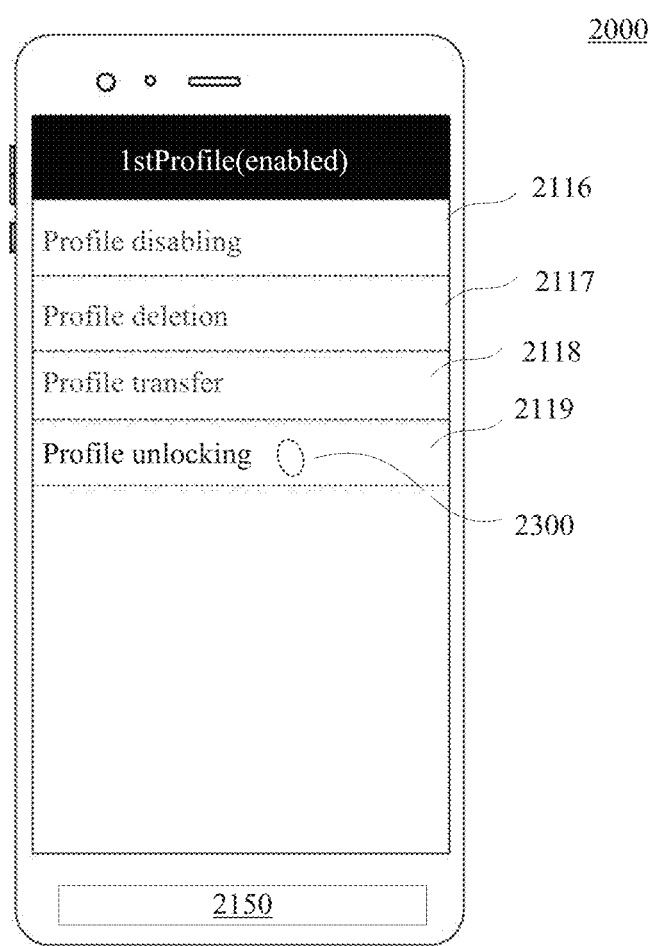
FIG. 5B is an example of another terminal.

A profile operation interface corresponding to the 1stProfile option 2111 may be entered by selecting the 1stProfile option 2111. As shown in FIG. 5A, a profile operation interface shown in FIG. 5B can be entered by tapping the 1stProfile option 2111 by using a user touch point 2200. As shown in FIG. 5B, the operation interface includes a profile disabling (disabling) option 2116, a profile deletion option 2117, a profile transfer option 2118, and a profile unlock option 2119. Options such as the profile disabling option 2116, the profile deletion option 2117, and the profile transfer option 2118 are in an unselectable state (a locked state). The profile unlock option 2119 is in a selectable state. An unlock operation may be triggered by tapping the profile unlock option 2119 by using a user touch point 2300.

Figure 5C:
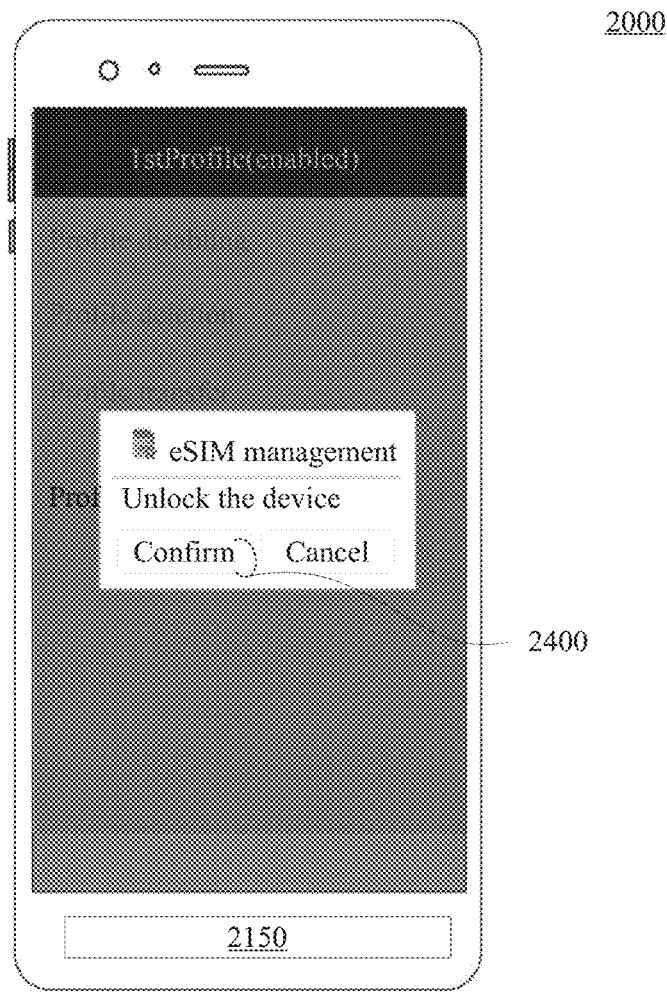
FIG. 5C is an example of still another terminal.
Figure 5D:
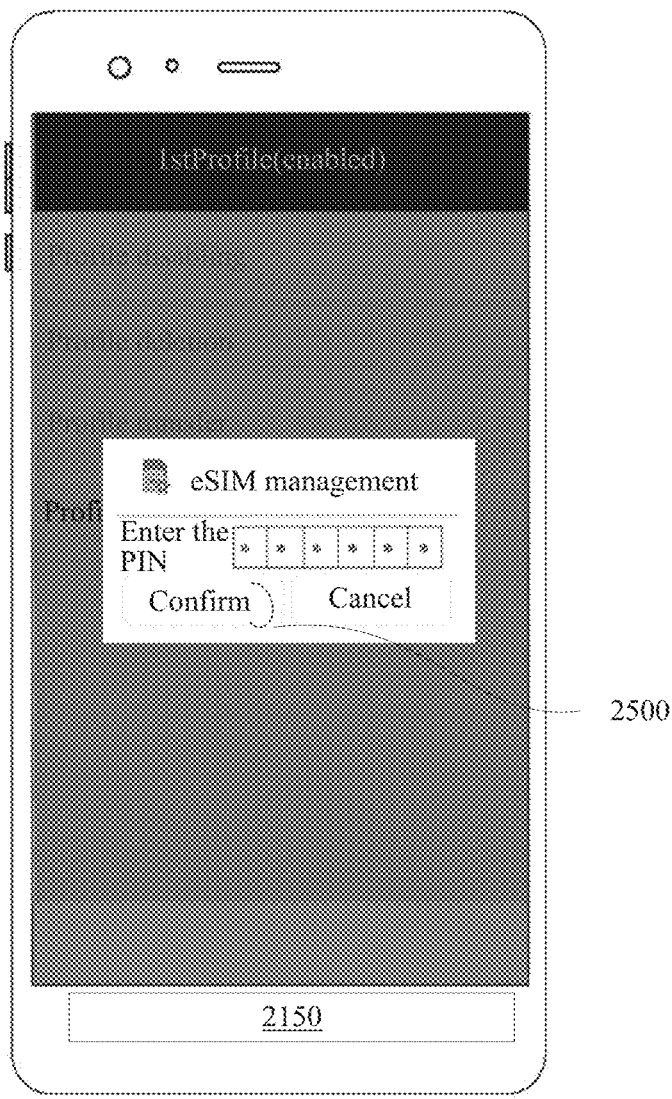
FIG. 5D is an example of yet another terminal.

As shown in FIG. 5C, the terminal receives an unlock request sent by a network side; or when the user triggers and taps the profile unlock option 2119, a prompt may be given by using the user interface, where the prompt may include confirmation and cancellation options. The confirmation option may be triggered by using a user touch point 2400, to enter a verification information input interface shown in FIG. 5D. As shown in FIG. 5D, the user is prompted to enter a six-digit personal identification number (Personal Identification Number, PIN) on the user interface, to perform verification. In addition, the confirmation and cancellation options may be further provided. The confirmation option may be triggered by using a user touch point 2500, to perform confirmation.

The PIN may be predefined by an operator server, or may be obtained by using negotiation between an operator server and user equipment. For example, the operator may set an initial PIN and store the initial PIN in the operator server and the eUICC. The user equipment may change the PIN stored in the eUICC, and notify the operator server; or the user equipment requests PIN changing from the operator server.

Figure 5E:
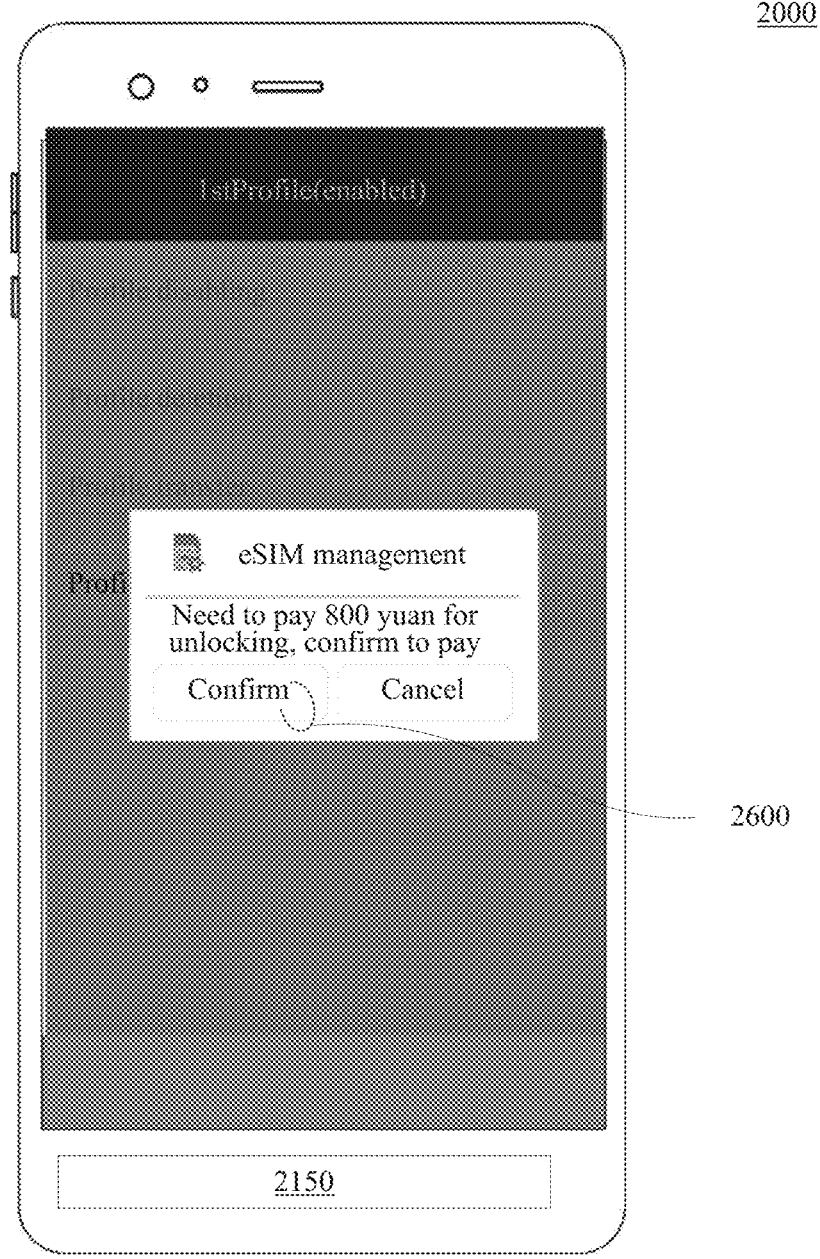
FIG. 5E is an example of yet another terminal.
Figure 5F:
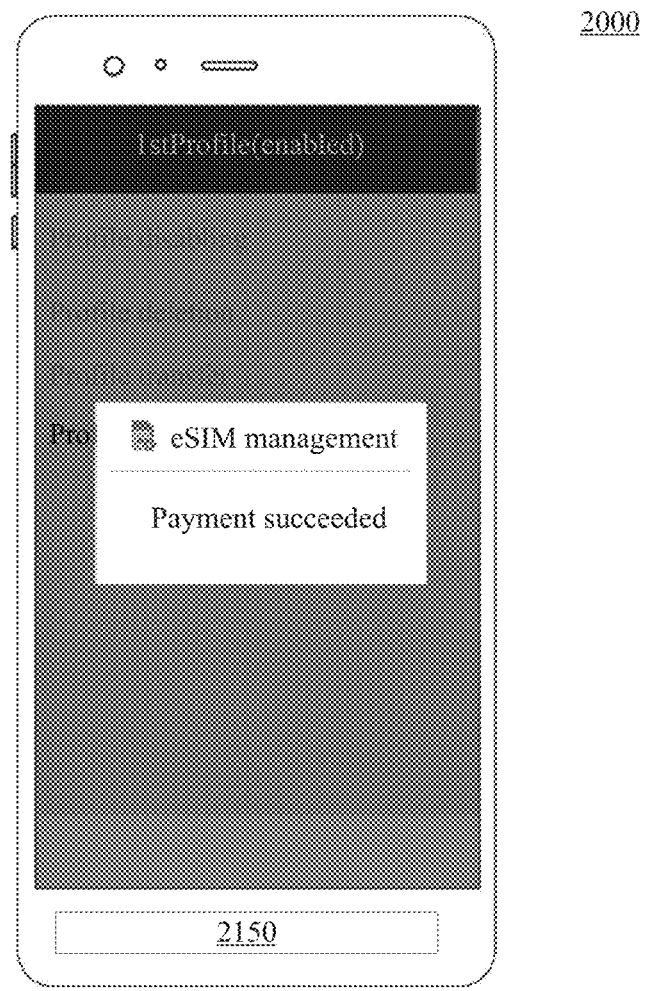
FIG. 5F is an example of yet another terminal.

After the terminal receives the unlock request triggered by the user and sends the unlock request to the server, the server determines an unlock condition, and when the unlock condition is that a particular fee needs to be paid, notifies the user of a required amount. As shown in FIG. 5E, an unlock and payment prompt is displayed by using the LUI, to prompt the user to complete payment before unlocking. The prompt may include confirmation and cancellation options. The confirmation option may be triggered by using a user touch point 2600, to confirm the payment. After the payment succeeds, a prompt may be given. As shown in FIG. 5F, a payment success interface is displayed.

This embodiment of the present invention is further described below with reference to FIG. 6 to FIG. 8. For clear descriptions, in the following embodiments, the eUICC is used as a separate body for description, and in the following embodiments, the terminal mainly provides the LPA module. It should be learned that, the eUICC is installed in the terminal, and in the following embodiments, descriptions are provided by using only that the SM-DP is an example of the profile download server. Description manners in the following embodiments do not constitute a limitation to the structure.

Figure 6:
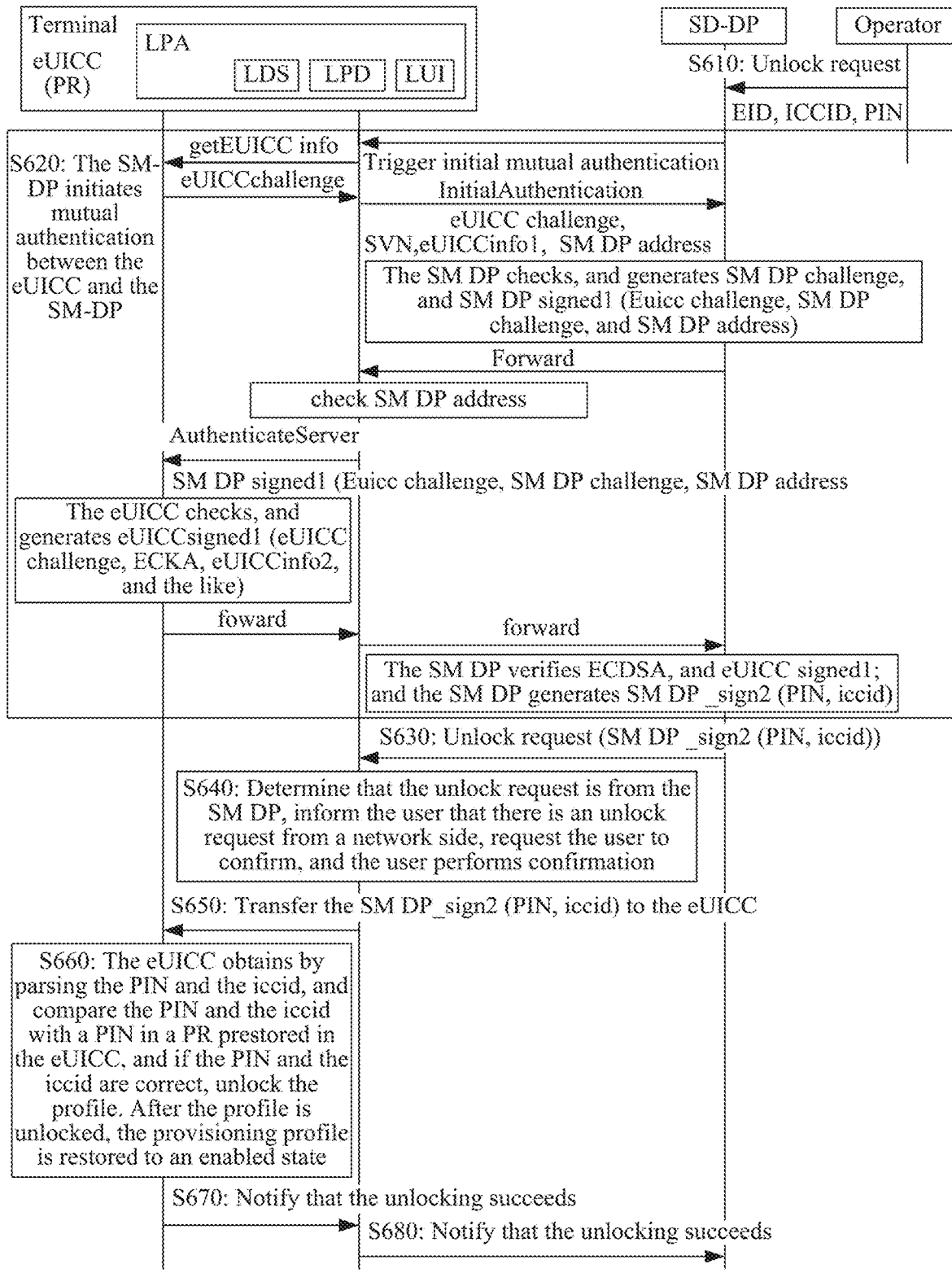
FIG. 6 is a signaling exchange diagram of a method for managing an eUICC according to an embodiment of the present invention.

FIG. 6 is a signaling exchange diagram of another method for managing an eUICC according to an embodiment of the present invention. In this embodiment of the present invention, the eUICC is embedded in a terminal, a profile is installed in the eUICC, and the profile includes policy rules. In this embodiment of the present invention, a bound profile in the eUICC in the terminal is unlocked by using an LPA deployed in the terminal, thereby improving user experience. The LPA may be deployed in the terminal, or may be deployed in the eUICC. An SM-DP is a server generating and downloading the profile. An operator server is an operator server bound with a currently enabled profile in a user terminal and providing a service.

As shown in FIG. 6, this embodiment of the present invention specifically includes the following steps.

S610: The SM-DP receives a first unlock request (Unlock request sent by the operator server, where the first unlock request carries any information or a combination of any information of an EID, an ICCID, or verification information.

Specifically, the operator server stores an EID, an ICCID, verification information used to unlock a profile in the eUICC, and the like. The operator server may request, according to the EID, the ICCID, and the verification information, the SM-DP to unlock the profile in the eUICC that is indicated by the EID and the ICCID.

For example, when publishing a terminal in which an eUICC is installed, an operator may install a profile in the eUICC in the terminal, and configure policy rules, so that operations such as disabling, deletion, removal, or profile switching can be performed on the profile only after the profile is unlocked. These operations may be uniformly referred to as locked user authorities. A user can use the locked user authorities only after these authorities are unlocked. A profile unlock condition may be that a user (a user who uses the terminal) pays a fee, a contract expires, or the like.

When the operator publishes the terminal in which the eUICC is installed, the operator server and the eUICC may correspondingly store an EID, an ICCID, and verification information of the terminal. The user may perform registration by using the terminal or the operator server. The operator server determines user information (for example, a name, a mail address, and a living address) by using the registration. The verification information may be further changed by using the registration. For example, the verification information may be a PIN. The operator server and the eUICC generally store a default PIN, and the user may change the PIN during the registration.

The verification information may be a PIN that is agreed on in advance, or may be an operator identifier. An eUICC operating system or an eUICC platform presets an authority list of policy rules that can set. The authority list includes an "Allowed Operators" field, and a policy rule corresponding to an operator identifier. For example, an authority corresponding to an operator A identifier corresponding to an operator A may be an authority to set "Disabling of this Profile is not allowed". That is, the operator A has an authority to set that a particular profile cannot be disabled. Alternatively, an authority corresponding to an operator A identifier is an authority to set or unset "Disabling of this Profile is not allowed". When the authority is disabled, the user can unlock the terminal, and disable the profile.

In addition, after the registration is finished, during use of the terminal, the verification information may be changed. For example, change of the verification information may be initiated by using the terminal, or change of the verification information may be initiated by using the operator server.

In this embodiment of the present invention, when the user is out of contract, the operator server may initiate an unlock operation; or after the user pays the operator, the operator server may initiate an unlock operation. In conclusion, when the operator server determines that the profile in the eUICC in the terminal satisfies the unlock condition, the operator server may initiate the unlock operation.

S620: The SM-DP initiates mutual authentication between the eUICC and the SM-DP. A process of the mutual authentication is further described below.

The SM-DP sends an initial authentication request (for example, Push to initialized mutual certification) to the terminal.

The terminal may send a request (for example, getEUICC info) to the eUICC by using the LPA, to obtain eUICC challenge.

The terminal may send an initial authentication (authentication performed by the eUICC on the SM-DP) message (InitialAuthentication) to the SM-DP by using the LPA, to initiate an initial authentication process. The initial authentication request may carry eUICC challenge information, SVN, eUICCinfo1, and an address of the SM-DP.

The SM-DP checks the eUICC challenge information, the eUICC info1, the corresponding address of the SM-DP that are received, and generates SM-DP challenge information. The SM-DP signs the address of the SM-DP, the eUICC challenge information, and the SM-DP challenge information, and then sends the address of the SM-DP, the eUICC challenge information, and the SM-DP challenge information to the LPA. After receiving the address of the SM-DP, the eUICC challenge information, and the SM-DP challenge information that are signed and sent by the SM-DP, and checking the address of the SM-DP, the LPA sends information with a signature to the eUICC for check.

After checking and confirming the information signed by the SM-DP, the eUICC signs eUICC challenge, ECKA, eUICCinfo2, and the like. The eUICC sends the information with a signature to the SM-DP by using the LPA of the terminal, and the SM-DP authenticates the eUICC. The SM-DP checks the signature of the eUICC, determines that the terminal in which the eUICC is located is an eligible terminal to be unlocked. The SM-DP generates SM-DP sign2, where the SM-DP sign2 is information obtained after the verification information and the ICCID are signed by the SM-DP, and sims obtained PIN information and sends the PIN information to the eUICC. The verification information may be a PIN that is agreed on in advance, or an operator identifier.

S630: The SM-DP sends a second unlock request (the second unlock request in this step is equivalent to the second unlock message in the embodiment shown in FIG. 4) to the terminal, where the second unlock request carries a signature of the SM-DP. The second unlock request may carry the EID and/or the ICCID, and the verification information with the signature. For example, the second request may be an unlock request carrying the SM DP _sign2. After the mutual authentication is performed on the eUICC and the SM-DP, after the SM-DP and the eUICC confirm identities of each other, the SM-DP may send the second unlock request to the eUICC.

S540: After receiving the second unlock request sent by the SM-DP, the terminal generates prompt information, to prompt the user to confirm to unlock the enabled profile of the eUICC.

In this embodiment of the present invention, unlocking of the eUICC is initiated from the network side (the SM-DP is a network side device of the terminal). In an unlocking process, the terminal may prompt the user, and unlock the enabled profile in the eUICC after the user enters confirmation information. Specifically, after receiving the second unlock request, the terminal may perform determining, and after determining that the second unlock request is from the network side, generate the prompt information, to prompt the user to confirm to unlock the profile in the eUICC. The terminal may determine, by using a signature in the second unlock request, whether the second unlock request is from the network side, that is, determine whether the second unlock request includes the signature of the SM-DP.

After receiving that the user confirms to unlock the profile of the eUICC, the terminal sends the second unlock request to the eUICC (the second unlock request in this step is equivalent to the first unlock message in the embodiment shown in FIG. 4).

S660: The eUICC unlocks the corresponding profile according to the second unlock request.

After receiving the second unlock request, the eUICC may obtain by parsing the EID and/or the ICCID, and the verification information that are carried in the second unlock request, compare locally stored verification information with the verification information obtained by parsing, and if the verification information is the same, unlock the profile corresponding to the EID and/or the ICCID. The eUICC may modify a parameter in the policy rule, for example, disables a parameter "Disabling of this Profile is not allowed", to unlock the profile.

After the UICC is unlocked, the provisioning profile is restored to the enabled state, to configure or obtain a new profile to access a new network and obtain a network connection service.

S670: The eUICC sends an unlock success confirmation message (Notify unlock success) to the terminal.

S680: The terminal sends the unlock success confirmation message to the SM-DP.

Figure 7:
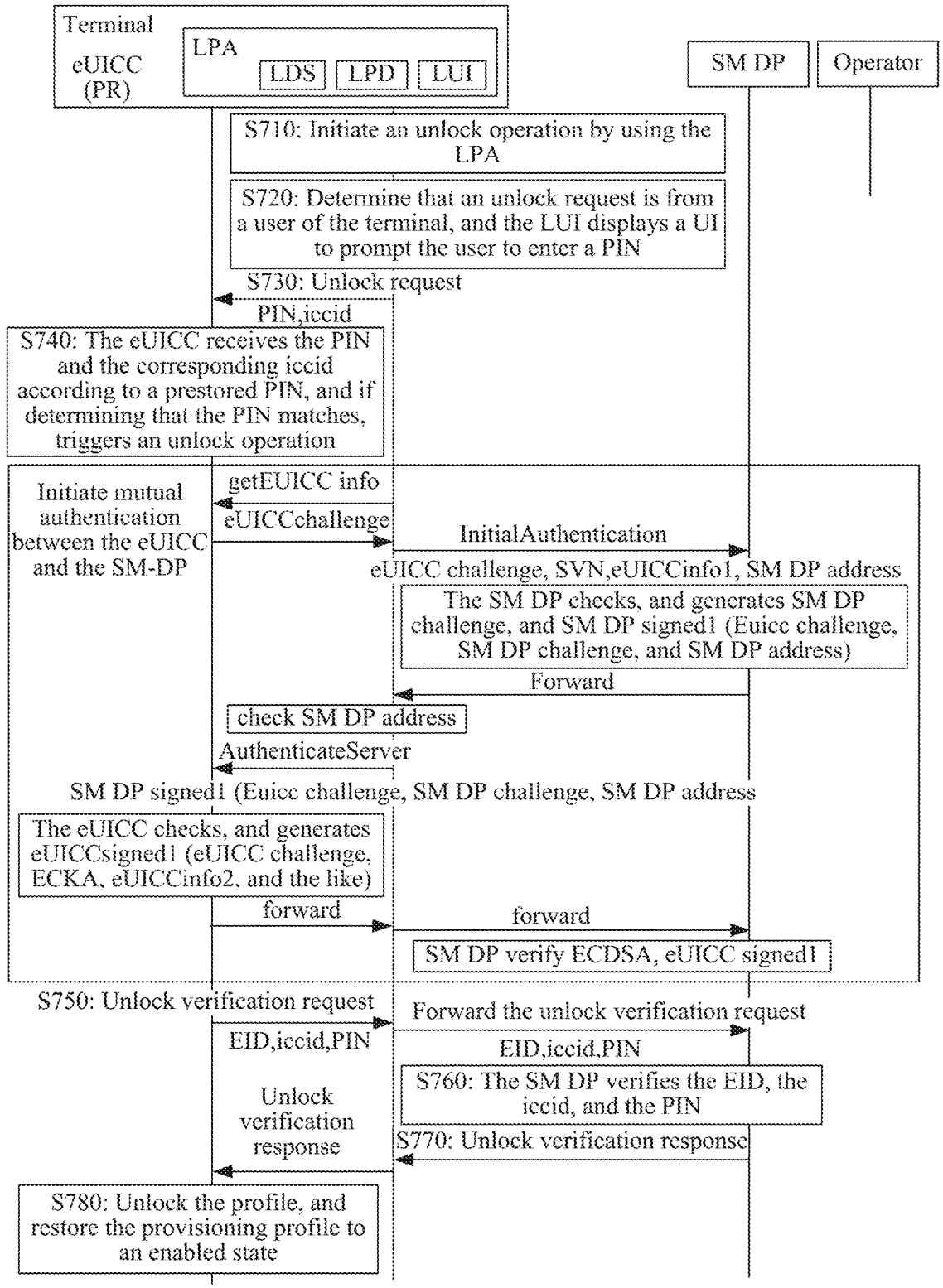
FIG. 7 is a signaling exchange diagram of another method for managing an eUICC according to an embodiment of the present invention.

FIG. 7 is a signaling exchange diagram of another method for managing an eUICC according to an embodiment of the present invention. By using this embodiment of the present invention, a method for initiating unlocking of a profile in an eUICC to a network side by using an LPA in a terminal is provided, and an eligible unlock operation is ensured by entering verification information by a user. As shown in FIG. 7, this embodiment of the present invention specifically includes the following steps.

S710: The terminal determines a first unlock request (the first unlock request in this step is equivalent to the second unlock message in the embodiment shown in FIG. 4), where the unlock request carries an EID and/or an ICCID, and the first unlock request is used to request to unlock a profile indicated by the EID and/or the ICCID.

The terminal may receive, by using the LPA, the first unlock request entered by the user. Specifically, the terminal may determine, by using a user interface provided by the LPA and used for unlocking the profile corresponding to the EID and/or the ICCID, the first unlock request entered by the user.

S720: The terminal obtains verification information required for unlocking the eUICC.

As described in the embodiment shown in FIG. 6, an operator server and the eUICC store at least one piece of information such as the EID, the ICCID, or the verification information used to unlock the profile in the eUICC.

The terminal may send an obtaining request to the eUICC or the operator server by using the LPA, to obtain the EID, the ICCID, the verification information used to unlock the profile in the eUICC, and the like that are stored in the eUICC.

The terminal may prompt the user to enter the verification information, so as to receive the verification information entered by the user. The verification information may be a PIN.

After determining that the first unlock request is received, the terminal needs to determine whether the user has an authority to perform an unlock operation on the eUICC. Therefore, the user needs to provide the verification information. S730: The terminal sends a second unlock request (Unlock request) (the second unlock request in this step is equivalent to the first unlock message in the embodiment shown in FIG. 4) to the eUICC, where the second unlock request may carry the verification information, and the RD and/or the ICCID, and the second unlock request is used to request to unlock the profile indicated by the EID and/or the ICCID.

S740: The eUICC performs matching between locally stored verification information corresponding to an EID and/or an ICCID and the verification information in the received second unlock request.

In an embodiment, if the locally stored verification information corresponding to the EID and/or the ICCID matches the verification information in the received second unlock request, the eUICC may request the terminal to perform mutual authentication between the eUICC and an SM-DP For a process of the mutual authentication, refer to a process in S220 in FIG. 2. After the mutual authentication between the eUICC and the SM-DP succeeds, S660 is performed.

S750: The eUICC sends a third unlock request (unlock verify request) (the third unlock request in this step is equivalent to the third unlock message in the embodiment shown in FIG. 4) to the terminal, where the third unlock request carries the EID and/or the ICCID, and the verification information; the eUICC may sign the EID and/or the ICCID, and the verification information; and the third unlock request is used to request the SM-DP to confirm to unlock the profile indicated by the EID and/or the ICCID.

The terminal forwards the third unlock request to the SM-DP.

S760: After receiving the third unlock request, the SM-DP verifies the EID and/or the ICCID, and the verification information, and if the EID and/or the ICCID, and the verification information are correct, the SM-DP confirms to unlock the profile.

Unlocking of the profile needs to be confirmed by the network side, and recording is performed on the network side.

Specifically, the SM-DP may parse the third unlock request, to obtain the EID and/or the ICCID, and the verification information, determine the verification information corresponding to the EID and/or the ICCID and stored in the operator server, compare the verification information corresponding to the EID and/or the ICCID and stored in the operator server with the verification information obtained by parsing the third unlock request, and when the verification information is the same, record the profile identified by the EID and/or the ICCID as unlocked.

S770: The SM-DP sends unlock confirmation information (unlock verify response) to the terminal.

After receiving the unlock confirmation information, the terminal sends the unlock confirmation information to the eUICC.

S780: After receiving the unlock confirmation information sent by the SM-DP, the eUICC unlocks the profile identified by the EID and/or the ICCID.

For a process in which the eUICC unlocks the profile identified by the EID and/or the ICCID, refer to the embodiment shown in FIG. 2.

In this embodiment of the present invention, after unlocking the profile identified by the EID and/or the ICCID, the eUICC may set a PP to an enabled state, to install a new profile.

Figure 8:
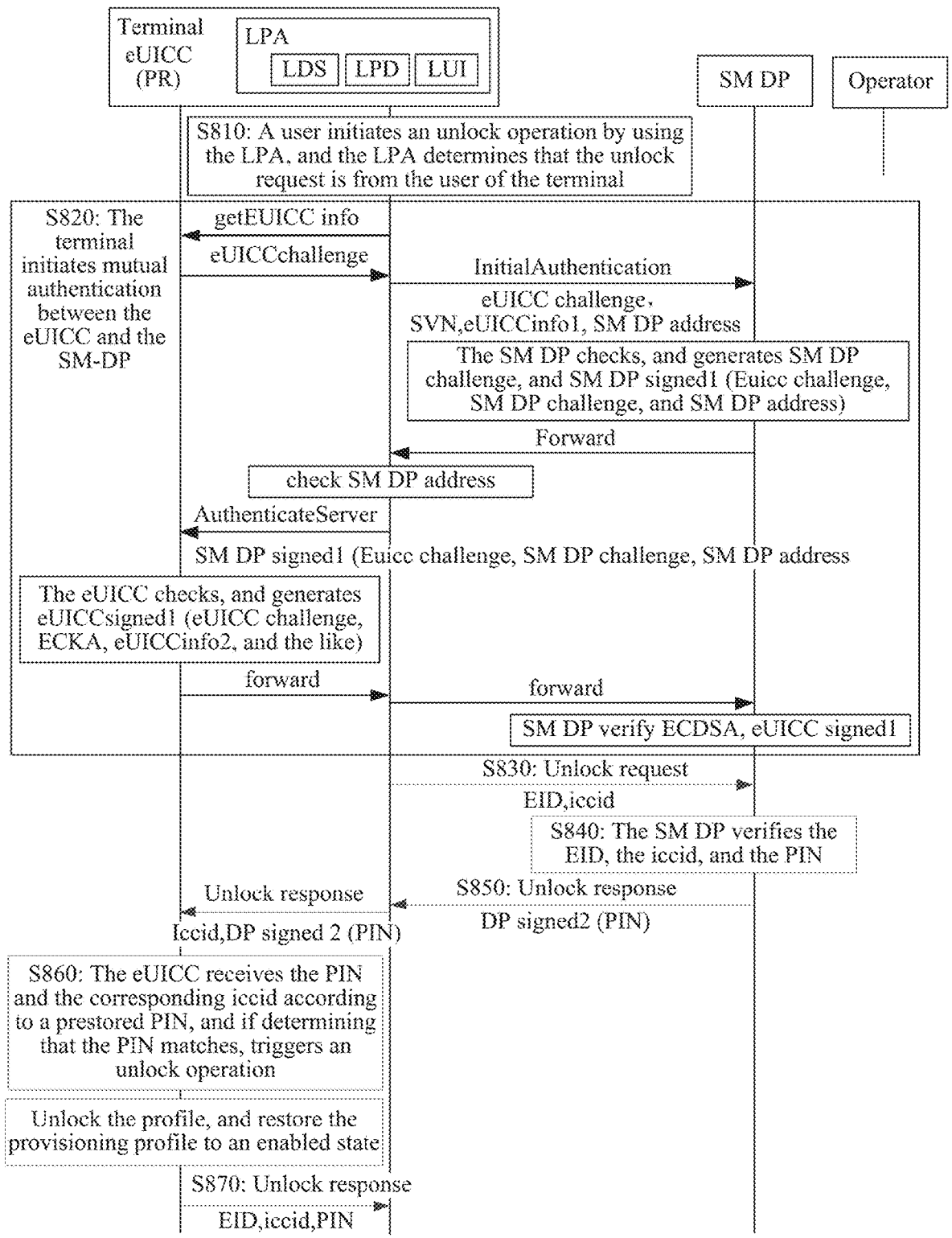
FIG. 8 is a signaling exchange diagram of still another method for managing an eUICC according to an embodiment of the present invention.

FIG. 8 is a signaling exchange diagram of still another method for managing an eUICC according to an embodiment of the present invention. By using this embodiment of the present invention, the following technical effect can be provided: when a user requests to unlock a profile, a network side notifies and requests, according to an attribute of the profile, an LPA required for the profile, and the LPA is selected without perception by the user, thereby improving user experience. As shown in FIG. 8, this embodiment of the present invention specifically includes the following steps.

S810: A terminal determines a first unlock request (the first unlock request in this step is equivalent to the second unlock message in the embodiment shown in FIG. 4), where the unlock request carries an EID and/or an ICCID, and the first unlock request is used to request to unlock a profile indicated by the RD and/or the ICCID.

For this step, refer to descriptions of S810.

S820: The terminal initiates mutual authentication between an eUICC and an SM-DP, For this step, refer to descriptions of S620.

S830: The terminal sends a second unlock request (unlock request) (the second unlock request in this step is equivalent to the fourth unlock message in the embodiment shown in FIG. 4) to the SM-DP, where the second unlock request carries the EID and/or the ICCID, and the first unlock request is used to request to unlock the profile corresponding to the EID and/or the ICCID.

S840: After receiving the second unlock request, the SM-DP determines whether the profile corresponding to the EID and/or the ICCID satisfies an unlock condition.

S850: When the profile corresponding to the EID and/or the ICCID satisfies the unlock condition, determine verification information corresponding to the EID and/or the ICCID. The SM-DP returns a response message of the second unlock request, where the response message carries verification information with a signature of the SM-DP. The verification information may be a PIN. Alternatively, the verification information may be identifier information of an operator to which the profile belongs (for example, the unlock response carries SM-DP signed2 (the verification information)).

After receiving the response message of the second unlock request sent by the SM-DP, the terminal sends the response message to the eUICC.

S860: After receiving the response message sent by the SM-DP (the response message in this step is equivalent to the first unlock message in the embodiment shown in FIG. 4), the eUICC obtains by parsing the verification information. Locally stored verification information is found according to the EID and/or the ICCID, matching is performed between the locally stored verification information and the verification information that is obtained by parsing according to the response information, and if the matching succeeds, an unlock operation is performed.

S870: After successfully performing unlocking, the eUICC returns an unlock confirmation message (unlock response) to the terminal, where the unlock confirmation message may carry one or more of the EID, the ICCID, or the verification information.

In this embodiment of the present invention, after unlocking the profile identified by the EID and/or the ICCID, the eUICC may set a PP to an enabled state, to install a new profile.

Figure 9:
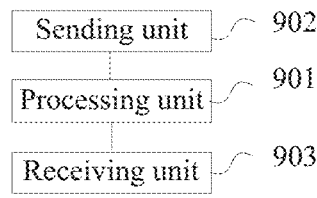
FIG. 9 is a schematic structural diagram of an apparatus for managing an eUICC according to an embodiment of the present invention.

FIG. 9 is a schematic structural diagram of an apparatus for managing an eUICC according to an embodiment of the present invention. As shown in FIG. 9, a profile is installed in the eUICC, the profile is locked according to a policy rule, and the apparatus includes:

a processing unit 901, configured to determine identifier information and verification information of the profile that needs to be unlocked, where the identifier information of the profile is used to identify the profile installed in the terminal; and a sending unit 902, configured to send a first unlock message to the eUICC, where the first unlock message carries the identifier information and the verification information of the profile, and the first unlock message is used to instruct the eUICC to determine the profile, and unlock the profile according to the policy rule after verification performed according to the verification information succeeds.

Optionally, the apparatus further includes:

a receiving unit 903, configured to receive a second unlock message, where the second unlock message carries the identifier information of the profile, and the second unlock message is used to instruct to unlock the profile.

Optionally, when the second unlock message is from a profile download server, the second unlock message further includes the verification information.

Optionally, the processing unit 901 is further configured to: generate prompt information according to the first unlock message, and display the prompt information on a user interface, where the prompt information is used to prompt for the profile that needs to be unlocked.

The receiving unit 903 is further configured to receive unlock confirmation information by using the user interface.

Optionally, when the second unlock message is from the terminal, the processing unit 901 receives the verification information by using the user interface.

Optionally, the receiving unit 903 is further configured to receive a third unlock message sent by the eUICC, where the third unlock message carries the identifier information and the verification information of the profile.

The sending unit 902 is further configured to send the third unlock message to a profile download server, so that the profile download server performs verification and/or registration.

Optionally, the sending unit 902 is further configured to send a fourth unlock message to the profile download server, where the fourth unlock message carries the identifier information of the profile that needs to be unlocked, and the fourth unlock message is used to message the verification information.

The receiving unit 903 is further configured to receive the verification information sent by the profile download server.

Optionally, the apparatus further includes: the processing unit 901 is further configured to obtain information about the eUICC and information about an SM-DP, to perform mutual authentication on the eUICC and the SM-DP.

Optionally, the apparatus further includes: a display unit, configured to display a payment interface, to perform a pay-to-unlock operation.

Figure 10:
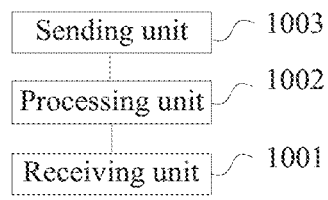
FIG. 10 is a schematic structural diagram of another apparatus for managing an eUICC according to an embodiment of the present invention.

FIG. 10 is a schematic structural diagram of another apparatus for managing an embedded universal integrated circuit card eUICC, according to an embodiment of the present invention. A profile is installed in the eUICC, the profile is locked according to a policy rule, and the apparatus includes:

a receiving unit 1001, configured to receive a first unlock message sent by the terminal, where the first unlock message carries identifier information and verification information of the profile, and the identifier information of the profile is used to identify the profile installed in the terminal; and a processing unit 1002, configured to: determine the profile, and perform verification according to locally stored verification information and the verification information carried in the first unlock message.

The processing unit 1002 is further configured to unlock the profile according to the policy rule after the verification succeeds.

Optionally, the processing unit 1002 is further configured to: determine, according to the policy rule, whether the profile satisfies an unlock condition; and if the profile satisfies the unlock condition, unlock the profile, and set a provisioning profile PP to an enabled state.

Optionally, the apparatus further includes: a sending unit 1003, configured to send another unlock message to a profile download server by using the terminal, where the another unlock message carries the identifier information and the verification information of the profile, and the another unlock message is used to message the profile download server to confirm to unlock the profile; and the receiving unit 1002 is further configured to receive, by using the terminal, unlock response information sent by the profile download server.

Optionally, the processing unit 1001 is further configured to perform mutual authentication with the SM-DP.

Figure 11:
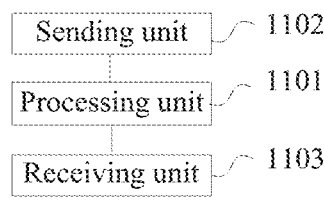
FIG. 11 is a schematic structural diagram of still another apparatus for managing an eUICC according to an embodiment of the present invention.

FIG. 11 is a schematic structural diagram of still another apparatus for managing an embedded universal integrated circuit card eUICC according to an embodiment of the present invention. A profile is installed in the eUICC, the profile is locked according to a policy rule, and the apparatus includes:

a processing unit 1101, configured to determine identifier information and verification information of the profile that needs to be unlocked, where the identifier information of the profile is used to identify the profile installed in the terminal.

When the profile satisfies an unlock condition, the processing unit 1101 is further configured to: after verification performed according to the verification information succeeds, mark, by the profile download server, the profile as unlocked.

Optionally, the apparatus further includes:

a sending unit 1102, configured to send an unlock message to the terminal, where the unlock message carries the identifier information of the profile, and the unlock message is used to instruct to unlock the profile.

Optionally, the apparatus further includes: a receiving unit 1103, configured to receive the identifier information and the verification information of the profile that are sent by the terminal.

Figure 12:
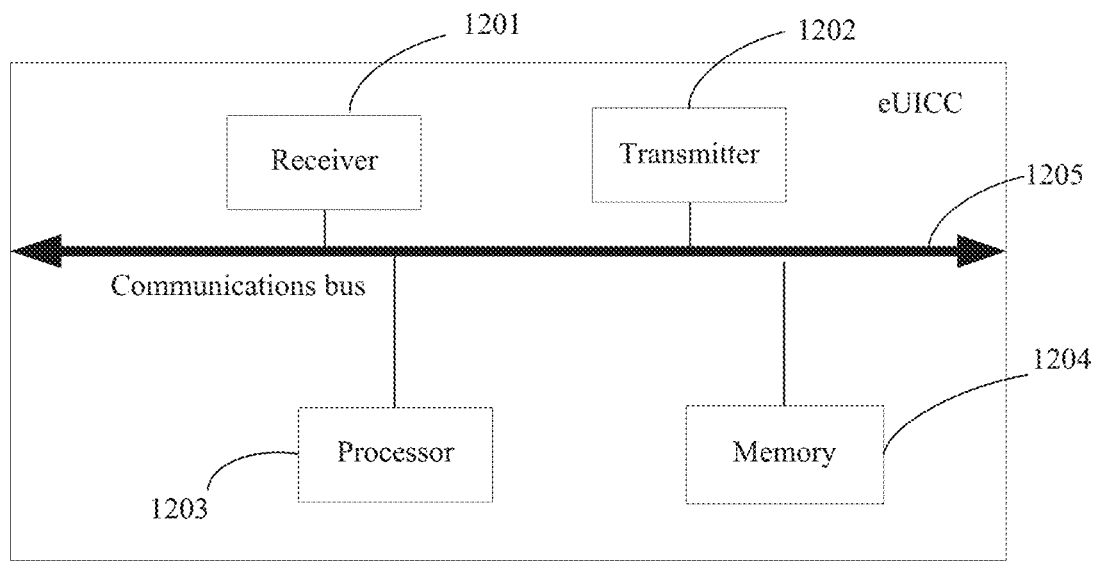
FIG. 12 is a schematic structural diagram of an eUICC according to an embodiment of the present invention.

FIG. 12 is a schematic structural diagram of an eUICC according to an embodiment of the present invention. The eUICC may specifically include a receiver 1201, a transmitter 1202, a processor 1203, and a memory 1204. The modules may be connected by using a bus 1205.

The receiver 1201 and the transmitter 1202 are configured to support information sending and receiving between the eUICC: and the terminal or the profile download server in the foregoing embodiment. For example, the receiver 1201 and the transmitter 1202 may be interface circuits, and support communication between the eUICC and an application processor of the terminal. In a process in which the eUICC communicates with the terminal, data and a signaling message are processed by the processor 1203, and are sent by the transmitter 1202 to the terminal. A signal from the terminal is received by the receiver 1201, and is processed by the processor 1203, to obtain data and signaling information sent or forwarded by the terminal. The processor 1203 further performs a processing process of the eUICC in FIG. 4 and FIG. 6 to FIG. 8 and/or another process applied to a technology described in this application. The memory 1204 is configured to store program code and data of the eUICC.

Figure 13:
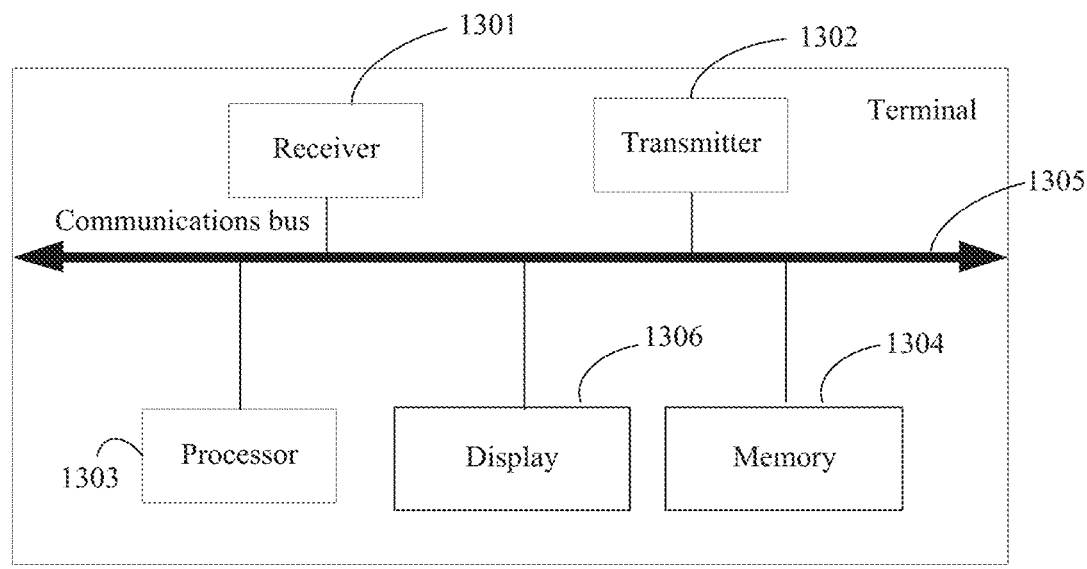
FIG. 13 is a schematic structural diagram of a terminal according to an embodiment of the present invention.

FIG. 13 is a schematic structural diagram of a terminal according to an embodiment of the present invention. The terminal may specifically include a receiver 1301, a transmitter 1302, a processor 1303, and a memory 1304, and a display 1306. The modules may be connected by using a bus 1305.

The receiver 1301 and the transmitter 1302 are configured to support information sending and receiving between the terminal and the eUICC or the profile download server in the foregoing embodiment. For example, the receiver 1301 and the transmitter 1302 may be interface circuits, and support communication between the terminal and the eUICC; or may be radio frequency circuits, and support communication between the terminal and the profile download server. The display 1306 is mainly configured to interact with a user. In some possible implementations, the display 1306 may be a touchscreen integrated with input and output functions. In a process in which the terminal communicates with the eUICC or the profile download server, data and a signaling message are processed by the processor 1303, and are sent by the transmitter 1302 to the eUICC or the profile download server. A signal from the eUICC or the profile download server is received by the receiver 1301, and is processed by the processor 1303, to obtain data and signaling information sent or forwarded by the eUICC or the profile download server. The processor 1303 further performs a processing process of the terminal in FIG. 4 and FIG. 6 to FIG. 8 and/or another process applied to a technology described in this application. The memory 1304 is configured to store program code and data of the terminal.

Figure 14:
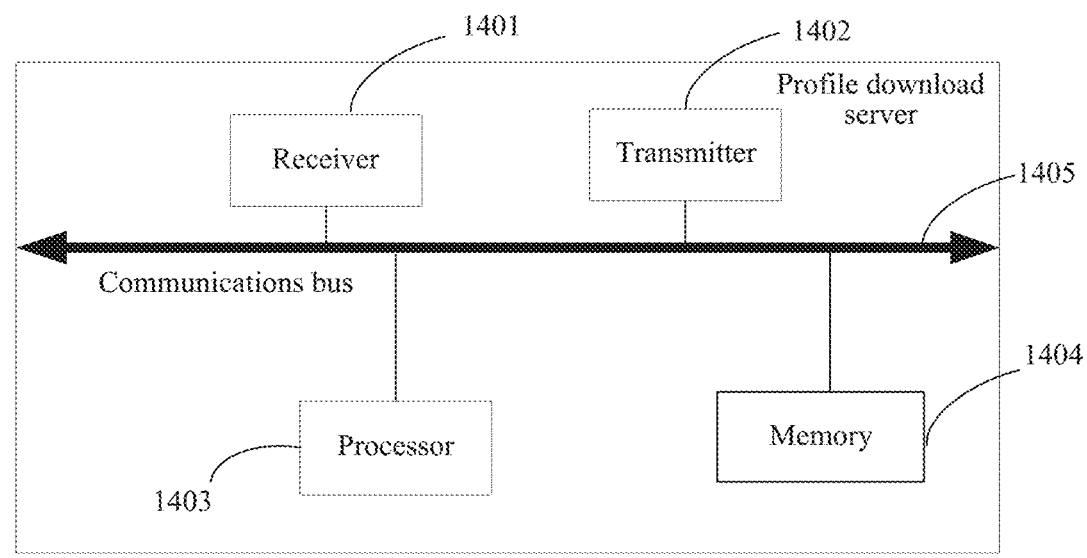
FIG. 14 is a schematic structural diagram of a profile download server according to an embodiment of the present invention.

FIG. 14 is a schematic structural diagram of a profile download server according to an embodiment of the present invention. The profile download server may specifically include a receiver 1401, a transmitter 1402, a processor 1403, and a memory 1404. The modules may be connected by using a bus 1405.

The receiver 1401 and the transmitter 1402 are configured to support information sending and receiving between the profile download server and the eUICC or the terminal in the foregoing embodiment. For example, the receiver 1401 and the transmitter 1402 may be radio frequency circuits, and support communication between the profile download server and the eUICC or the terminal. In a process in which the profile download server communicates with the eUICC or the terminal, data and a signaling message are processed by the processor 1403, and are sent by the transmitter 1402 to the UICC or the terminal. A signal from the UICC or the terminal is received by the receiver 1401, and is processed by the processor 1403, to obtain data and signaling information sent by the UICC or the terminal. The processor 1403 further performs a processing process of the profile download server in FIG. 4 and FIG. 6 to FIG. 8 and/or another process applied to a technology described in this application. The memory 1404 is configured to store program code and data of the profile download server.

It should be understood that in all the foregoing embodiments of the present invention, the processor may be a central processing unit (Central Processing Unit, CPU for short), or the processor may be another general purpose processor, a digital signal processor (DSP), an application-specific integrated circuit (ASIC), a field programmable gate array (FPGA), or another programmable logic device, a discrete gate or a transistor logic device, a discrete hardware component, or the like. The general purpose processor may be a microprocessor or the processor may be any normal processor, or the like.

The memory may include a read-only memory and a random access memory, store program code, and provide an instruction and data to the processor.

The communications bus may further include a power bus, a control bus, a status signal bus, and the like, in addition to a data bus. However, for clear description, various types of buses in the figure are marked as the communications bus.

In an implementation process, steps in the foregoing methods can be implemented by using a hardware integrated logical circuit in the processor, or by using instructions in a form of software. The steps of the method disclosed with reference to the embodiments of the present invention may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory, and a processor reads information in the memory and completes the steps in the foregoing methods in combination with hardware of the processor. To avoid repetition, details are not described herein again.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both an application that runs on a computing device and a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

In addition, aspects or features of the present invention may be implemented as a method, an apparatus or a product that uses standard programming and/or engineering technologies. The term "product" used in this application covers a computer program that can be accessed from any computer readable component, carrier or medium. For example, the computer-readable medium may include but is not limited to: a magnetic storage component (for example, a hard disk, a floppy disk or a magnetic tape), an optical disc (for example, a CD (Compact Disk, compact disk), a DVD (Digital Versatile Disk, digital versatile disk), a smart card and a flash memory component (for example, EPROM (Erasable Programmable Read-Only Memory, erasable programmable read-only memory), a card, a stick, or a key drive). In addition, various storage media described in this specification may indicate one or more devices and/or other machine-readable media that is used to store information. The term "machine readable media" may include but is not limited to a radio channel, and various other media that can store, contain and/or carry an instruction and/or data.

A person of ordinary skill in the art may be aware that, in combination with the examples described in the embodiments disclosed in this specification, units and algorithm steps may be implemented h electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

The foregoing descriptions are merely example implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for managing an embedded universal integrated circuit card (eUICC) installed in an electronic device, wherein the method comprises:
   receiving, by the electronic device from a network side device while an already installed profile of an operator is installed in the eUICC and is locked according to a policy rule, a first unlock message that instructs to unlock the already installed profile and that carries identifier information of the already installed profile and verification information; and
   sending, by the electronic device, a second unlock message to the eUICC, wherein the second unlock message carries the identifier information of the already installed profile and the verification information to prompt the eUICC to determine the already installed profile, perform verification according to the verification information, and unlock the already installed profile according to the policy rule after the verification succeeds, wherein first operations can be performed after the already installed profile is unlocked, and wherein the first operations comprise disabling the already installed profile, deleting the already installed profile, downloading a second profile of another operator, or enabling the second profile of the other operator.

2. The method of claim 1, further comprising:
   displaying, by the electronic device, prompt information on a user interface, wherein the prompt information prompts for the already installed profile; and
   receiving, by the electronic device, unlock confirmation information using the user interface.

3. The method of claim 2, further comprising generating, by the electronic device, the prompt information.

4. The method of claim 1, further comprising:
   obtaining, by the electronic device, information about the eUICC and information about the network side device; and
   performing, by the electronic device, mutual authentication on the eUICC and the network side device.

5. The method of claim 1, further comprising displaying, by the electronic device, payment information on a user interface to prompt performance of a pay-to-unlock operation.

6. The method of claim 1, further comprising:
   receiving, by the electronic device, an unlock request from at least one of a network or a user interface; and
   sending, by the electronic device, a notification to the eUICC that an unlock operation is to be performed, wherein the eUICC is unlocked after the eUICC successfully performs matching on the verification information.

7. The method of claim 1, wherein the network side device is a subscription manager.

8. The method of claim 7, wherein the method further comprises determining that the first unlock message is from the network side device, and wherein the electronic device sends the second request message responsive to determining that the first unlock message is from the network side device.

9. An electronic device comprising:
an embedded universal integrated circuit card (eUICC), wherein an already installed profile of an operator is installed in the eUICC, and wherein the already installed profile is locked according to a policy rule;
a transceiver; and
a processor coupled to the eUICC and the transceiver and configured to:
receive, from a network side device while the already installed profile is installed in the eUICC and is locked according to the policy rule, a first unlock message that instructs to unlock the already installed profile and that carries identifier information of the already installed profile and verification information; and
send a second unlock message to the eUICC, wherein the second unlock message carries the identifier information of the already installed profile and the verification information to prompt the eUICC to determine the already installed profile, perform verification according to the verification information, and unlock the already installed profile according to the policy rule after the verification succeeds, wherein first operations can be performed after the already installed profile is unlocked, and wherein the first operations comprise disabling the already installed profile, deleting the already installed profile, downloading a second profile of another operator, or enabling the second profile of the other operator.

10. The electronic device of claim 9, further comprising a touchscreen coupled to the processor and configured to:
display prompt information on a user interface, wherein the prompt information prompts for the already installed profile to be unlocked; and
receive unlock confirmation information using the user interface.

11. The electronic device of claim 10, wherein the processor is further configured to generate the prompt information.

12. The electronic device of claim 9, wherein the processor is further configured to:
obtain information about the eUICC and information about the network side device; and
perform mutual authentication on the eUICC and the network side device.

13. The electronic device of claim 9, further comprising a touchscreen coupled to the processor and configured to display a payment information on a user interface to prompt performance of a pay-to-unlock operation.

14. The electronic device of claim 9, wherein the network side device is a subscription manager.

* * * * *